(12) United States Patent
Ghiretti et al.

(10) Patent No.: US 6,406,247 B1
(45) Date of Patent: Jun. 18, 2002

(54) APPARATUS FOR LOADING AND UNLOADING A CONTAINER ON TO AND OFF A VEHICLE

(75) Inventors: André Ghiretti, Caussade; Guy Ghiretti, Monteils, both of (FR)

(73) Assignee: Palfinger AG, Bergheim (AU)

( * ) Notice: Subject to any disclaimer, the term of this patent is extended or adjusted under 35 U.S.C. 154(b) by 0 days.

(21) Appl. No.: 09/617,781

(22) Filed: Jul. 17, 2000

(30) Foreign Application Priority Data

May 17, 2000 (EP) .............................. 00110469

(51) Int. Cl.$^7$ ................................. B60P 1/64
(52) U.S. Cl. .................. 414/498; 414/457; 414/491
(58) Field of Search .................. 414/498–500, 414/444, 457, 491

(56) References Cited

U.S. PATENT DOCUMENTS

| | | | | |
|---|---|---|---|---|
| 4,341,500 A | * | 7/1982 | Laitinen | 414/498 |
| 4,589,671 A | * | 5/1986 | Boughton | 414/546 |
| 4,854,807 A | * | 8/1989 | Bishop | 414/498 |
| 5,163,800 A | * | 11/1992 | Raisio | 414/500 |
| 6,158,947 A | * | 12/2000 | Goiran et al. | 414/500 |

FOREIGN PATENT DOCUMENTS

| | | |
|---|---|---|
| DE | 41 43 001 | 7/1993 |
| GB | 2 274 645 | 3/1994 |
| NL | 9201352 | 2/1994 |

* cited by examiner

*Primary Examiner*—Joseph E. Valenza
*Assistant Examiner*—Mark A. Deuble
(74) *Attorney, Agent, or Firm*—Wenderoth, Lind & Ponack, L.L.P.

(57) ABSTRACT

An apparatus for loading and unloading a container on to and off of a vehicle, wherein the container has two symmetrically arranged rollers and a centrally arranged hook. The apparatus includes an angular arm at an end of which is arranged a coupling device which is provided with a pair of hooks for engaging behind the rollers and which can be engaged into the hook.

17 Claims, 5 Drawing Sheets

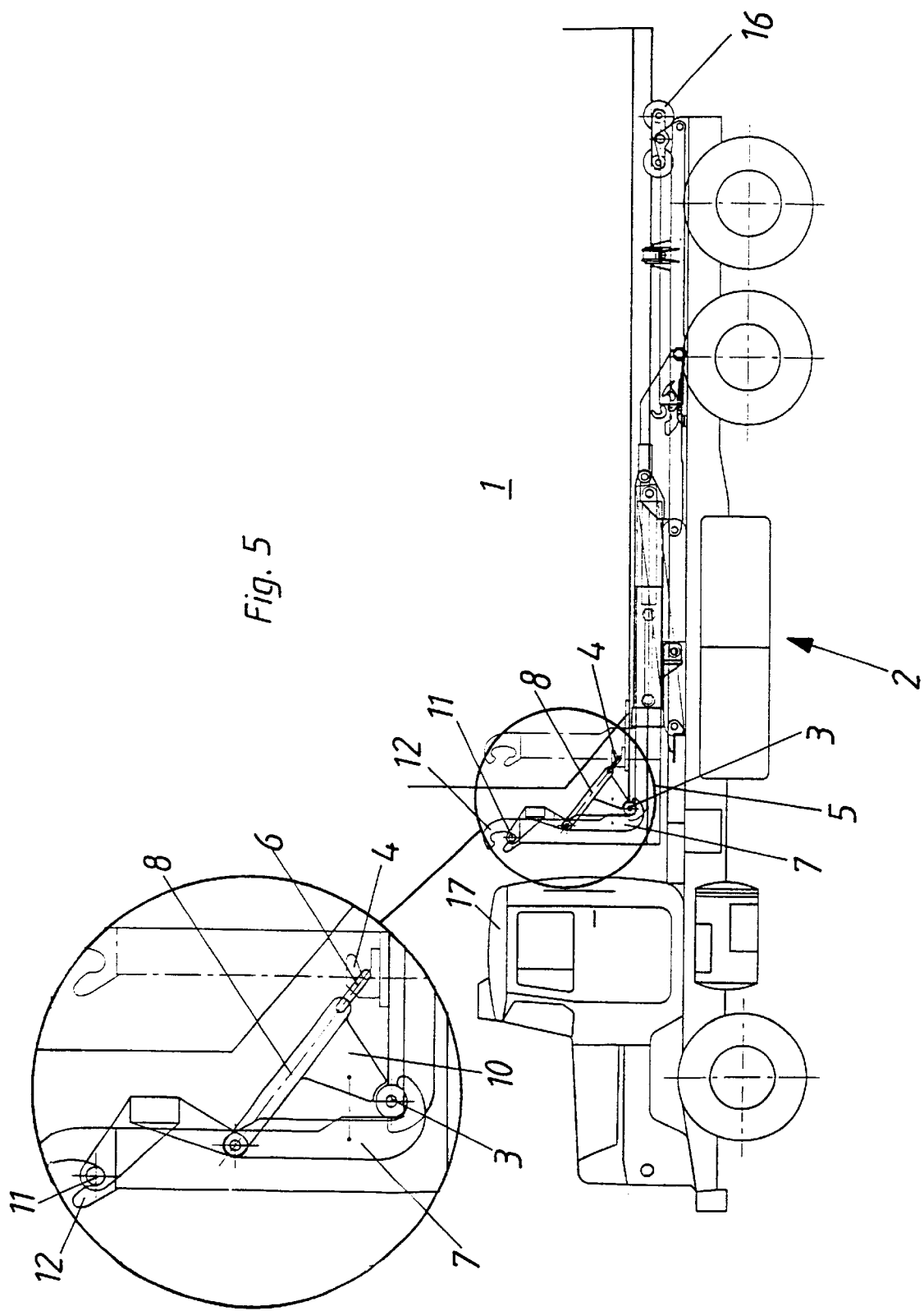

APPARATUS FOR LOADING AND UNLOADING A CONTAINER ON TO AND OFF A VEHICLE

BACKGROUND OF THE INVENTION

1. Field of the Invention

The invention relates to an apparatus for loading and unloading a container on to and off of a vehicle, wherein the container has two symmetrically arranged rollers and a centrally arranged hook in the proximity of its lower edge towards the vehicle.

2. Description of the Related Art

Containers of this kind are standardized in the United States of America. In order to move them from a highway onto a load surface of a truck, cable hoists are used, which are engaged into the centrally arranged hooks. In Europe, in contrast, containers are provided with a yoke or stirrup which an angular arm can engage by means of a hook at the wall towards the vehicle, in order to lift the container, whereupon the angular arm together with the container secured thereto is displaced in the longitudinal direction of the vehicle. The arm is in the form of an angle member with two limbs, and it pivots out at an end of one of those limbs. The limb that is provided with the hook is telescopic. An example of a structure of this kind is shown in DE 25 57 169 A1.

BRIEF SUMMARY OF THE INVENTION

The present invention is based on the realization that containers of the kind defined in the opening part of this specification can also be loaded and unloaded on to a roll-off tipper truck which in itself is designed for handling European containers, with an angular arm. For this purpose, the invention provides an apparatus that includes an angular arm, at the end of which is arranged a coupling device which is provided with a pair of hooks for engaging behind the rollers and which can be engaged into the hook.

If the coupling device according to the invention is to be used only for handling the containers defined in the opening part of this specification, it can form a fixed component of the overall apparatus. If containers of the European and US types are to be selectively handled, the coupling device is to be in the form of a removable adaptor, which can be effected by the coupling device being provided with a yoke or stirrup into which can be engaged the hook arranged on the angular arm.

There are numerous possible options in regard to the structural configuration of the invention and they will be described by way of example with reference to the drawings.

BRIEF DESCRIPTION OF THE DRAWINGS

FIGS. 3 through 5 show a second embodiment of the coupling device according to the invention in three different functional positions in each case together with a detail on an enlarged scale.

DETAILED DESCRIPTION OF THE INVENTION

Figure 1:
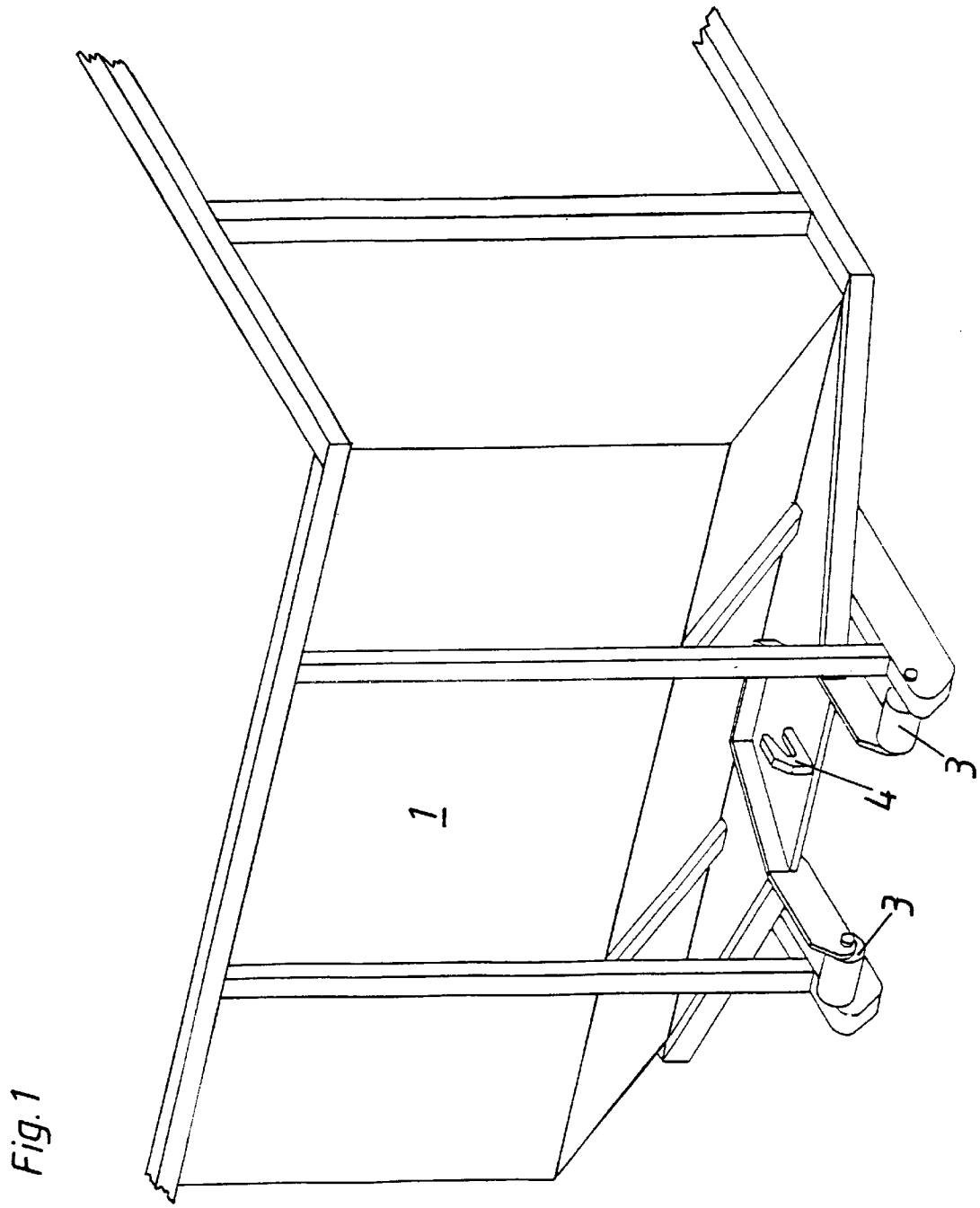
FIG. 1 is a diagrammatic view of an end part of a container which is to be handled by the invention.

FIG. 1 shows an inclined lower front edge of a container 1. Provided beneath the inclined region at a central position is a hook 4 which can serve to move the container 1 by means of a cable. In addition, two symmetrically arranged rollers 3 are provided for the same purpose.

Figure 2:
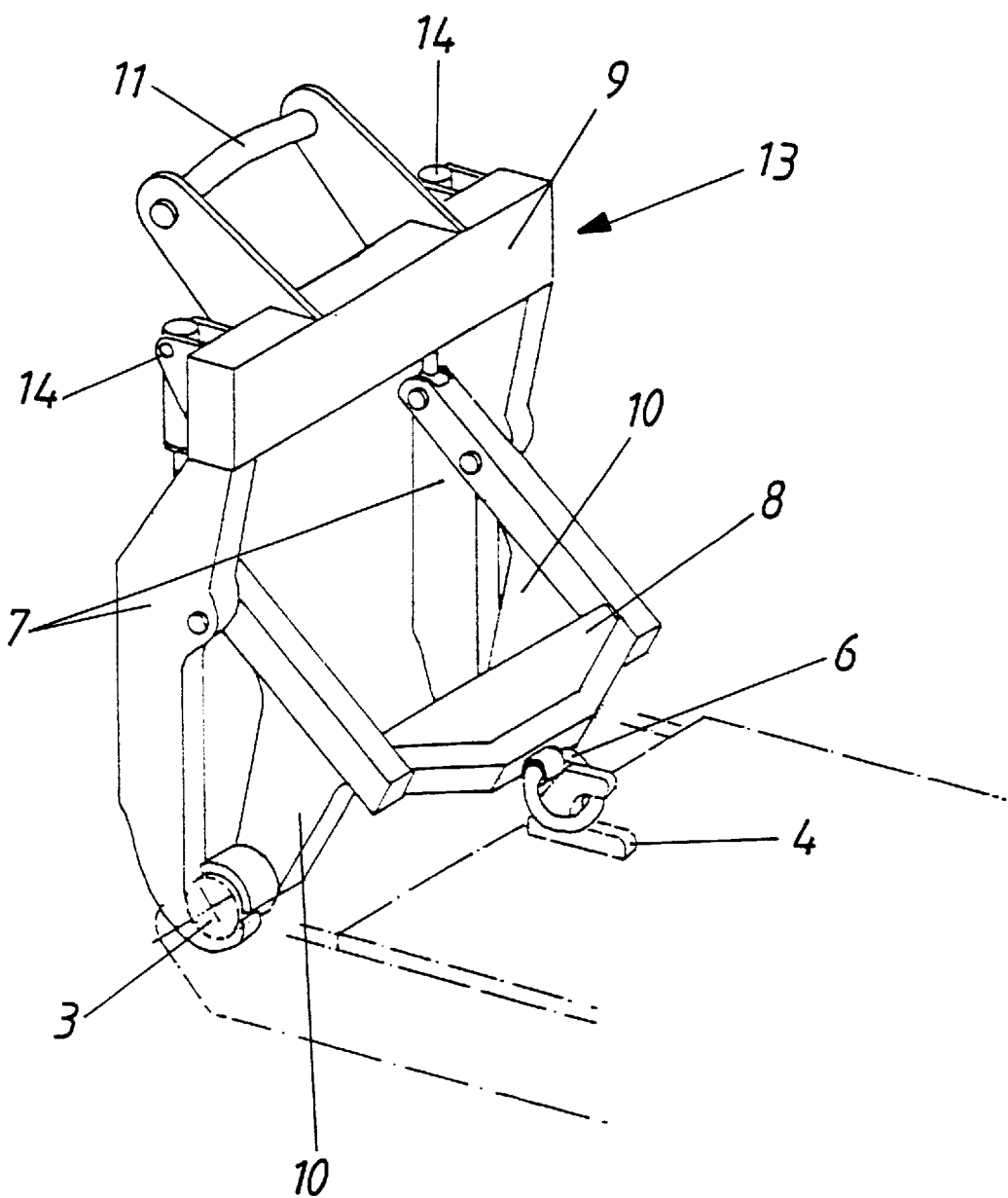
FIG. 2 shows a coupling device according to the invention and its relationship with the container shown in FIG. 1 in the working position.

FIG. 2 shows a first embodiment of a coupling device 13 which makes it possible for the container shown in FIG. 1 to be securely engaged. An essential part of the coupling device 13 is a pair of hooks 7 which are connected by a transverse member 9. Pivotally mounted to the pair of hooks 7 is a pivotal member 8 in the form of a U-shaped frame which can be engaged by means of a ring 6 or an engagement part into the hook 4. When the pair of hooks 7 are engaged with the rollers 3, the pivotal member 8 is supported by way of struts 10 against the rollers 3. So that this association is securely maintained, the pivotal member 8 can be fixed in its position by locking cylinders 14. Instead of a hydraulic fixing of this kind, it would also be possible to provide a mechanical locking action between the members 8 and 7.

In order to be able to handle the coupling device 13 by means of a roll-off tipper provided with a pivotable arm, the coupling device 13 is provided with a yoke or stirrup 11. If, in contrast, only containers as shown in FIG. 1 are to be loaded and unloaded, it would also be possible for the coupling device 13 to be permanently connected by way of a hinge joint to an angular arm 5 shown in FIG. 3.

Figure 3:
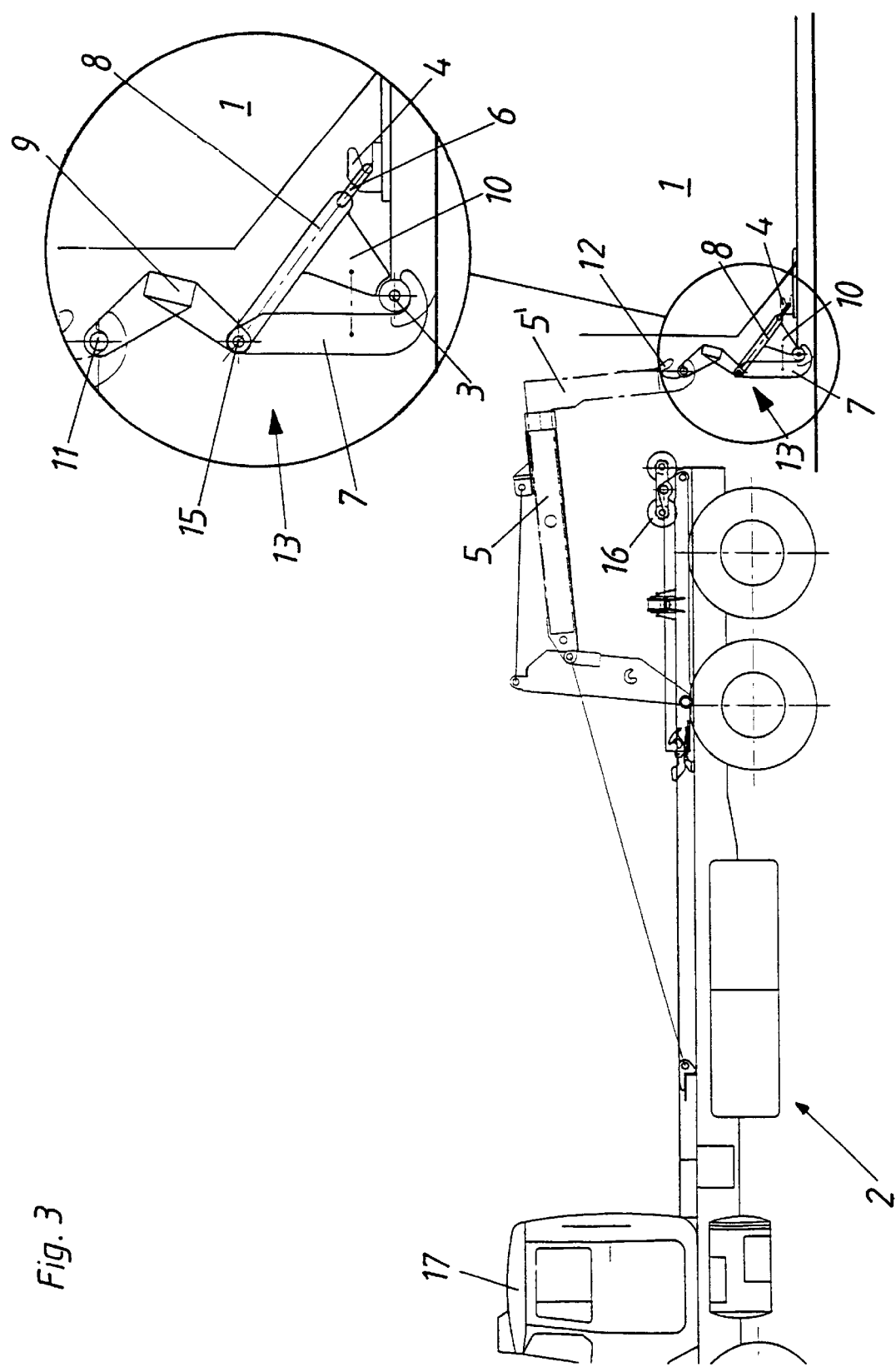
Figure 4:
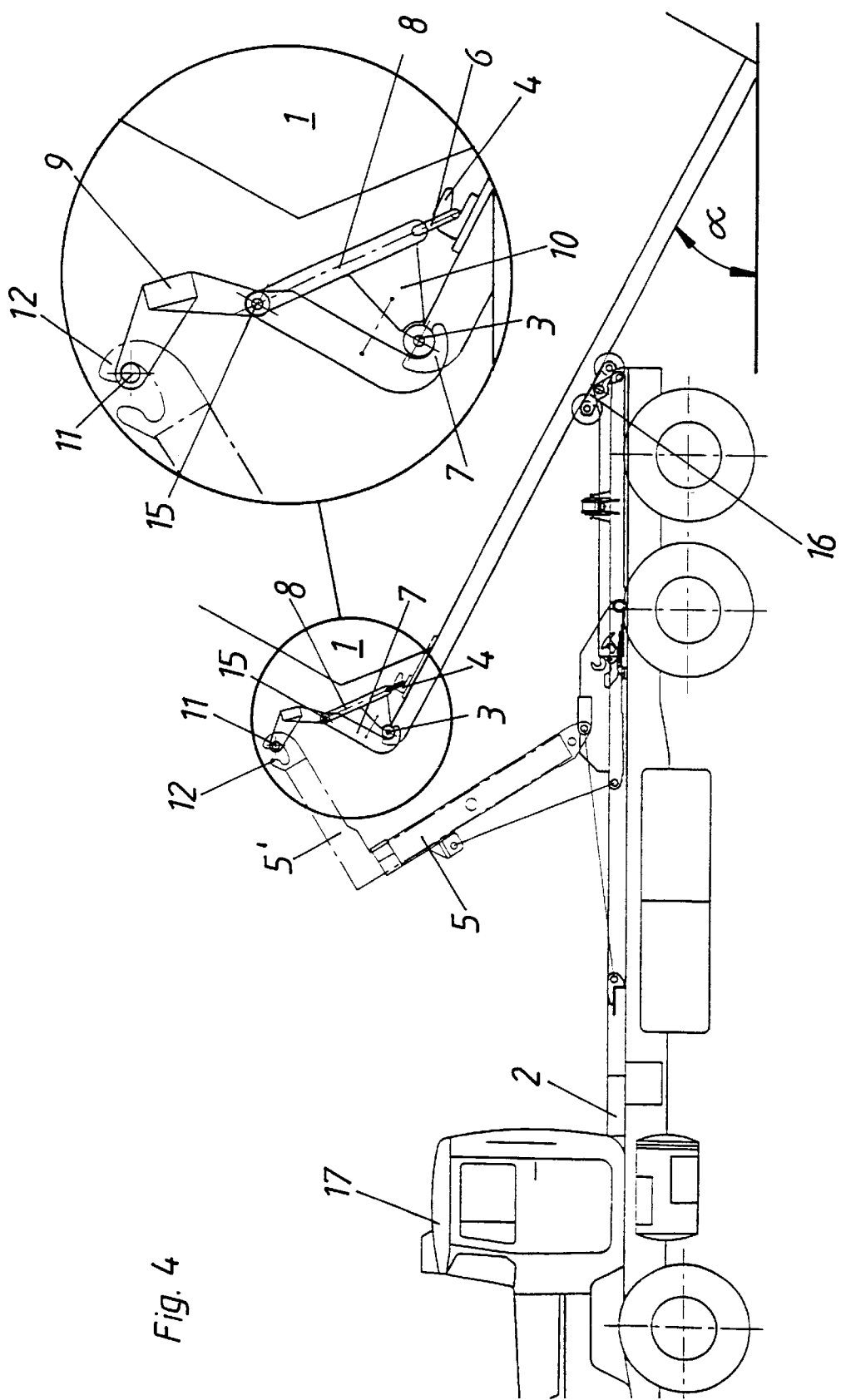

The coupling device 13 used in the embodiment illustrated in FIGS. 3 through 5 differs from that shown in FIG. 2 by virtue of a hinge joint 15 which pivotably connects the transverse member 9 which carries the yoke or stirrup 11 to the pair of hooks 7 and the pivotal member 8 which is pivotal with respect to the pair of hooks 7.

FIG. 3 shows the operation for picking up the container 1 by means of the coupling device 13. The fact that the pivotal member 8 is supported against the pair of hooks 7 by means of the struts 10 ensures that the coupling device 13 does not damage the container 1.

When the container 1 moves from the position shown in FIG. 3 into the position shown in FIG. 4, by being pulled over a pair of rollers 16, the advantage of the hinge joint 15 shows itself, insofar as a length of a telescopic arm 5' can be kept small. This means that the angle of incidence α which the container 1 reaches before it is tilted on to the load surface of a vehicle 2 is very small.

FIG. 5 shows the apparatus according to the invention in the travel position and demonstrates how the coupling device 13 can be disposed between a driving cab 17 and the container 1.

What is claimed is:

1. An apparatus for loading and unloading a container having two symmetrically arranged rollers and a centrally arranged hook onto and off of a vehicle, said apparatus comprising:
   an angular arm; and
   a coupling device arranged at an end of said angular arm, said coupling device having a pair of hooks operable to engage the two symmetrically arranged rollers, and an engagement device operable to engage the centrally arranged hook of the container, wherein said engagement device has a fixed length.

2. An apparatus according to claim 1, further comprising a transverse member connecting said pair of hooks.

3. An apparatus according to claim 1, wherein said engagement device comprises:
   a pivotal member being pivotal with respect to said pair of hooks; and
   a ring being arranged on said pivotal member.

4. An apparatus according to claim 3, wherein said pivotal member is a U-shaped rectangular frame.

5. An apparatus according to claim 4, further comprising a plurality of struts operable to support said pivotal member against the two symmetrically arranged rollers.

6. An apparatus according to claim 5, wherein a position of said pivotal member can be fixed relative to said pair of hooks.

7. An apparatus according to claim 3, wherein said pivotal member and said pair of hooks are pivotal with respect to each other and jointly.

8. An apparatus according to claim 1, wherein said angular arm has an outermost limb, said outermost limb being extendable and retractable.

9. An apparatus according to claim 1, wherein said coupling device further comprising a yoke, and said angular arm comprises a hook, said yoke engaging said hook.

10. A coupling device to be arranged at an end of an angular arm having a hook for loading and unloading a container having two symmetrically arranged rollers and a centrally arranged hook onto and off of a vehicle, said coupling device comprising:

a pair of hooks operable to engage the two symmetrically arranged rollers;

a pivotal member pivotally mounted to said pair of hooks; and an engagement part connected to said pivotal member, said engagement part being operable to engage the centrally arranged hook of the container.

11. A coupling device according to claim 10, further comprising a transverse member connecting said pair of hooks.

12. A coupling device according to claim 10, wherein said engagement part comprises a ring being arranged on said pivotal member.

13. A coupling device according to claim 12, wherein said pivotal member is a U-shaped rectangular frame.

14. A coupling device according to claim 13, further comprising a plurality of struts operable to support said pivotal member against the two symmetrically arranged rollers.

15. A coupling device according to claim 14, wherein a position of said pivotal member can be fixed relative to said pair of hooks.

16. A coupling device according to claim 13, wherein said pivotal member and said pair of hooks are pivotal with respect to each other and jointly.

17. A coupling device according to claim 10, further comprising a yoke operable to be engaged by the hook on the angular arm.

* * * * *